United States Patent [19]

Zaiser et al.

[11] Patent Number: 4,601,104
[45] Date of Patent: Jul. 22, 1986

[54] HANDHELD PLANER

[75] Inventors: Adolf Zaiser, Koengen; Dieter Raichle, Reudern; Helmut Schwaiger, Unterensingen; Adolf Hermann, Neckartailfingen; Edgar Bischof, Frickenhausen, all of Fed. Rep. of Germany

[73] Assignee: Karl M. Reich Maschinenfabrik Gesellschaft mit beschraenkter Haftung, Nuertingen, Fed. Rep. of Germany

[21] Appl. No.: 703,048

[22] Filed: Feb. 19, 1985

[30] Foreign Application Priority Data

Feb. 24, 1984 [DE] Fed. Rep. of Germany ....... 3406728

[51] Int. Cl.$^4$ .............................................. B27C 1/10
[52] U.S. Cl. ......................................... 30/475; 30/476
[58] Field of Search .......................... 30/475, 476, 477

[56] References Cited

U.S. PATENT DOCUMENTS

| 1,433,497 | 10/1922 | Carter | 30/475 |
| 1,527,785 | 2/1925 | Carter | 30/475 |
| 2,672,172 | 3/1954 | Godfrey et al. | 30/475 |

FOREIGN PATENT DOCUMENTS

| 2141584 | 3/1973 | Fed. Rep. of Germany | 30/475 |
| 7812329 | 8/1978 | Fed. Rep. of Germany | |
| 527464 | 5/1955 | Italy | 30/475 |

Primary Examiner—Frederick R. Schmidt
Assistant Examiner—J. T. Zatarga
Attorney, Agent, or Firm—W. G. Fasse; D. H. Kane, Jr.

[57] ABSTRACT

In order to achieve an improved chip and shaving ejection in a portable planer, a small portion of the motor cooling air stream is diverted and directed through an air passage into a chip ejection channel. The volume flow of this chip ejection air stream may be controlled by a control slider gate to suit various operating conditions. The chip ejection air stream also serves to cool the drive belt and planing head. The diverted air flow keeps the chips in a sufficiently loose state to assure an effective, clog-free ejection of chips. Furthermore, a deflection flap is used in the chip ejection channel to eject the chips to either side of the tool as desired.

7 Claims, 2 Drawing Figures

HANDHELD PLANER

FIELD OF THE INVENTION

The invention relates to a handheld or portable planer, having a planing head driven by an electric motor mounted in a housing. The planing head is rotatably mounted in the same housing as the motor. The planer further comprises a blower attached to the electric motor for producing a motor cooling air stream, and a chip ejection channel in the housing to which the motor cooling air stream may be guided through a connecting channel.

DESCRIPTION OF THE PRIOR ART

Such a portable planer is known from German Utility Model Publication No. 7,812,329 wherein most of the cooling air stream is directed to the chip ejection channel for blowing out the chips and shavings, whereby a high kinetic energy is imparted to the chips in addition to the chip velocity imparted by the planing head. This high kinetic energy may cause the chips to wedge and lodge against each other, thereby clogging the chip ejection channel. Furthermore, the chips can only be expelled from the chip ejection channel from one side of the tool. Therefore, in certain operating positions, the ejected chips will necessarily strike the operator, thereby becoming an annoyance and an inconvenience.

OBJECTS OF THE INVENTION

In view of the above, it is the aim of the invention to achieve the following objects singly or in combination:

to provide a portable planer of the type described above, in which the chips may be effectively expelled from the chip ejection channel, without becoming lodged in the ejection channel and to avoid clogging of the ejection channel;

to provide such a planer with an adjustable chip ejection channel, so that chips may be expelled from either side of the tool housing as desired, for greater safety and convenience of the operator;

to provide such a planer with a means for adjusting the chip ejection air flow, so that the advantageous characteristics may be maximized under various operating conditions; and to direct the chip ejection air stream in such a planer so that it simultaneously achieves a drive belt cooling effect for the planing head drive belt.

SUMMARY OF THE INVENTION

These objects have been achieved in a portable planer according to the invention, by an air stream connecting channel comprising a branch duct through which only a small portion of the total motor cooling air volume is directed into the chip ejection channel. Tests have shown surprisingly, that a satisfactory ejection of the chips out of the tool can be assured with only a relatively small portion of the motor cooling air being directed into the chip ejection channel. Thus, with this reduced air flow, the chips do not become wedged or lodged against each other, and they may effectively be expelled from the tool under all operating conditions. According to the invention the branched off air flow acts as a loosening means for the chips.

This becomes especially advantageous when a pivotal damper-type deflection flap is operatively mounted in the chip ejection channel. The expelled chip stream may be directed to either side of the tool as desired, by means of this deflection flap. For this purpose, the tool housing has chip exits on both sides. The observed effectiveness is maximized when the opening for the air stream is located below the bottom or lower end of the deflection flap when it is pivoted to eject chips on the side of the tool opposite the air stream opening. However, a considerable improvement in chip ejection is also achieved, even if the deflection flap of such a planer having an air stream opening only on one side is pivoted so as to eject chips on the same side as the air stream opening.

Preferably, one air stream opening is provided on each side of the housing, to achieve an optimal chip ejection to either side of the machine as desired. Also by adjusting a control or adjustment element in the connecting channel, it is possible to adjust or match the branched off air flow to the existing operating conditions.

A further advantage is achieved in that the hollow chamber which acts as the connecting channel also houses the planing head and the drive belt for the planing head, whereby the air stream will serve for chip ejection and for cooling the drive belt and the planing head. The air flow for chip ejection is sufficient to cool the belt, and will remain constant since the air flow passages will not become clogged or obstructed by chips and shavings.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
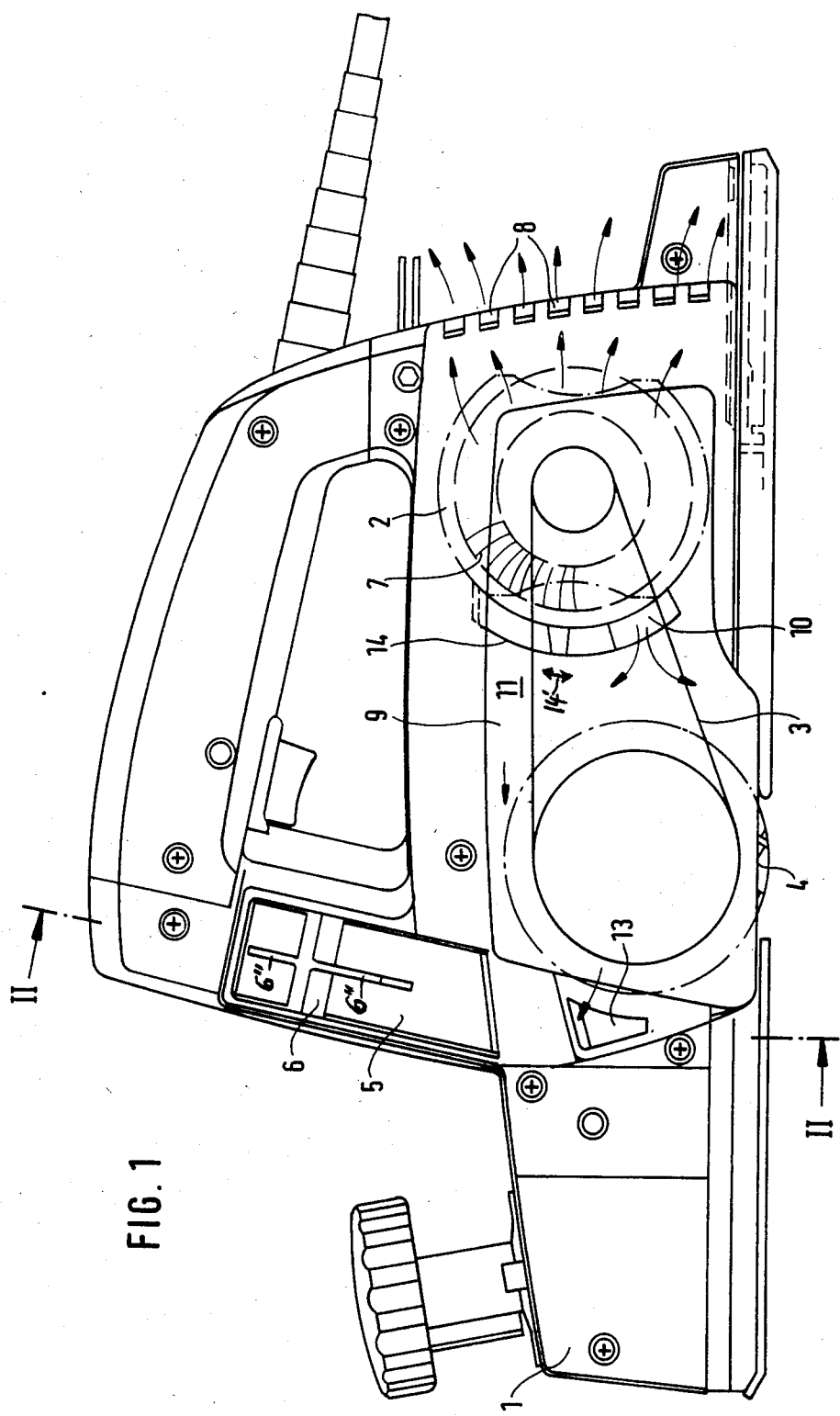
FIG. 1 shows a portable planer in a view from the drive belt side, with the side cover removed.
Figure 2:
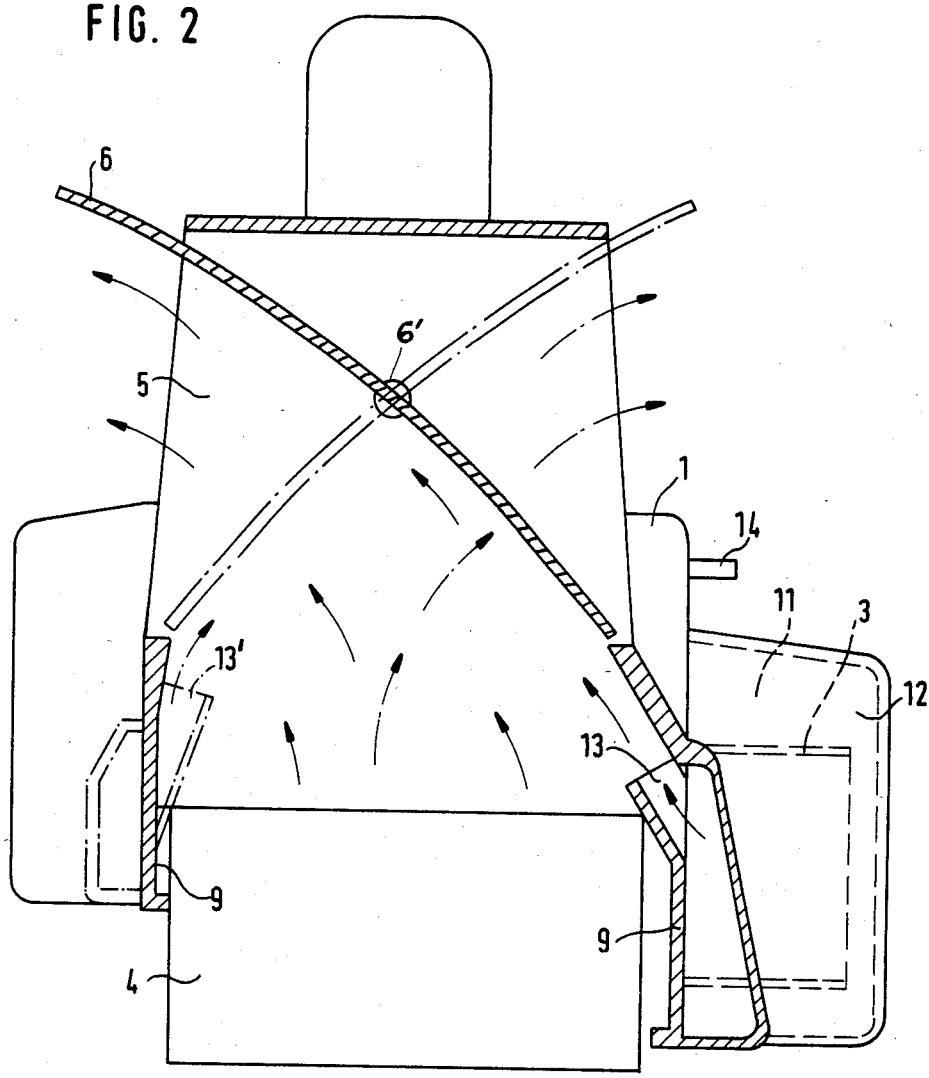
FIG. 2 is a sectional view along section line II—II in FIG. 1.

An electric motor 2, which is arranged in a housing 1 of the portable planer, drives the planing head 4 by means of a belt 3. The chips and shavings removed from the work piece by the planing head 4 pass upwards through a chip ejection channel 5 and out of the tool. For this purpose, the housing 1 has a lateral chip ejection opening in each housing side wall as best seen in FIG. 2. These chip ejection openings lead out of said chip ejecting channel for ejecting chips laterally out of the housing.

A deflection flap 6 is pivotally mounted on an essentially horizontal axis 6' in the chip ejection channel 5. The flap 6 may have reinforcing ribs 6". By manually pivoting this deflection flap 6 as desired either into the full line position or into the dash-dotted position the chip stream may be directed out of the housing on the left or right side thereof, as seen in FIG. 2.

A blower 7 draws cooling air axially through the motor 2, and then exhausts most of this cooling air stream to the outside of the tool through slots 8. However, a window or port 10 is provided in a side wall 9 of the housing 1 for passing a small portion of the motor cooling air stream through the port 10 into the chamber 11 which houses the planing head 4 and the drive belt 3 for the planing head. The chamber 11 is enclosed by a hood or cover 12, see FIG. 2. The air stream through the window 10 thus serves to cool the drive belt 3 and planing head 4. The chamber 11 then extends to directly below the chip ejection channel 5 and is connected thereto through an air stream passage 13 which leads at an angle upwards into the chip ejection channel as best seen in FIG. 2.

If the deflection flap 6 is in a position as shown by solid lines in FIG. 2, then the air passage 13 opens directly under the lower end of the deflection flap 6, whereby the angle of inclination of the air passage 13 substantially corresponds to the angle of inclination of the flap 6, thereby forming an extension of the deflection flap 6. The redirected or branched-off portion of the cooling air is thus guided along the deflection flap 6 and achieves a trouble-free ejection of the chips which are entrained in this air stream.

Even if the deflection flap 6 is in a position shown by dash-dotted lines in FIG. 2, the branched-off cooling air stream can still maintain such a chip ejecting air flow in the chip ejection channel 5 so that the chips may be effectively ejected rather than compacted and jammed as in the prior art.

In order to further improve this chip loosening effect, a second air passage 13' may be provided on the opposite side of the chip ejection channel 5 as shown in the left side by dash-dotted lines in FIG. 2. This second air passage 13' is located substantially opposite the first air passage 13. Both air passages 13, 13' cooperate with said deflection flap 6 when the latter is in one or the other operative position for moving chips through the chip ejection openings in the lateral housing walls.

In order to control or adjust the branched-off air stream through the window or port 10 for various operating conditions, an adjustment element in the form of a slider gate 14 is provided for the window or port 10. This slider gate 14 may be manually adjusted, as indicated by the arrow 14', by the operator, whereby the port 10 is opened to a lesser or greater extent in order to regulate the volume of air flow which is branched-off through the chamber 11 to the chip ejection channel 5.

The most advantageous chip ejection air volume has been found to be 5-10% of the total motor cooling air volume. However, under certain operating conditions, the chip ejection air flow may be adjusted to account for up to 30% of the motor cooling flow.

Although the invention has been described with reference to specific example embodiments, it is to be understood, that it is intended to cover all modifications and equivalents within the scope of the appended claims.

We claim:

1. A portable planer, having a planing head rotatably mounted in a housing and driven through a drive belt by an electric motor also mounted in said housing, comprising a blower connected to a drive shaft of said electric motor for producing a motor cooling air stream, chip ejection channel means in said housing, a connecting channel for communicating said blower and said chip ejection channel means, a branching port in said connecting channel for diverting only a volume portion of said motor cooling air stream into said chip ejection channel means as a chip ejection air stream for keeping chips in a loose state for an efficient chip ejection, said housing having side walls and a chip ejection opening in each housing wall, said chip ejection openings leading out of said chip ejection channel means, a journal axis in said chip ejection channel means, a damper-type deflection flap pivotally mounted on said journal axis in said chip ejection channel means above said planing head for flipping said deflection flap back and forth between two operative positions for guiding chips out of the respective chip ejection opening, said connecting channel comprising at least one air passage (13) in said housing for said chip ejection air stream, said air passage passing at an angle upwards into said chip ejection channel means for direct cooperation with the deflection flap in its operating position.

2. The portable planer of claim 1, wherein said connecting channel is so dimensioned that the ejection air volume directed to said chip ejection channel means amounts to at most 30% of said cooling air volume produced by said blower.

3. The portable planer of claim 1, wherein said journal axis is arranged horizontally in a normal use position of said portable planer.

4. The portable planer of claim 1, wherein said air passage is located to open below a bottom edge of said deflection flap when said deflection flap is adjusted into a position for ejecting chips to the side of the tool opposite said air passage, and whereby the inclination angle of said air passage is essentially the same as the inclination angle of said deflection flap in said ejecting position.

5. The portable planer of claim 1, comprising one air passage in each side of said housing on opposite sides of said chip ejection channel means, whereby said deflection flap is so positioned in an operative position that air from both air passages helps moving chips through the chip ejection opening.

6. The portable planer of claim 1, further comprising an adjustment element (14) in said connecting channel for controlling said chip ejection air stream volume which is to be directed into said chip ejection channel means.

7. The portable planer of claim 1, wherein said connecting channel comprises a chamber which houses said planing head and said drive belt, so that said chip ejection air stream also achieves a head and belt cooling effect before it is directed into said chip ejection channel means.

* * * * *

UNITED STATES PATENT AND TRADEMARK OFFICE
CERTIFICATE OF CORRECTION

PATENT NO. : 4,601,104

DATED : July 22, 1986

INVENTOR(S) : Adolf Zaiser et al

It is certified that error appears in the above-identified patent and that said Letters Patent is hereby corrected as shown below:

Claim 1, (column 4, line 9) line 14, after "housing"

insert --side--.

Signed and Sealed this

Seventh Day of October, 1986

[SEAL]

Attest:

DONALD J. QUIGG

Attesting Officer

Commissioner of Patents and Trademarks